(12) United States Patent
Lotz et al.

(10) Patent No.: US 10,031,311 B2
(45) Date of Patent: Jul. 24, 2018

(54) HOLDING APPARATUS FOR AN OPTICAL MEASUREMENT DEVICE

(71) Applicant: Carl Mahr Holding GmbH, Göttingen (DE)

(72) Inventors: Markus Lotz, Apolda (DE); Lars Heiser, Jena (DE); Michael Stepputat, Lipprechterode (DE)

(73) Assignee: Carl Mahr Holding GmbH, Göttingen (DE)

( * ) Notice: Subject to any disclaimer, the term of this patent is extended or adjusted under 35 U.S.C. 154(b) by 0 days.

(21) Appl. No.: 15/133,370

(22) Filed: Apr. 20, 2016

(65) Prior Publication Data

US 2016/0306133 A1 Oct. 20, 2016

(30) Foreign Application Priority Data

Apr. 20, 2015 (DE) .......................... 10 2015 105 978

(51) Int. Cl.
*G02B 7/00* (2006.01)
*G02B 7/02* (2006.01)
(Continued)

(52) U.S. Cl.
CPC .......... *G02B 7/003* (2013.01); *G01B 5/0004* (2013.01); *G01B 11/2433* (2013.01);
(Continued)

(58) Field of Classification Search
CPC .......... G02B 23/14; G02B 23/16; G02B 7/00; G02B 7/003; G02B 7/023; G02B 7/02;
(Continued)

(56) References Cited

U.S. PATENT DOCUMENTS 4,298,281 A * 11/1981 Schave .................. G01B 11/27
356/138
4,734,778 A 3/1988 Kobayashi
(Continued)

FOREIGN PATENT DOCUMENTS

DE 3531156 C1 9/1986
DE 3622843 A1 2/1987
(Continued)

OTHER PUBLICATIONS

English translation from German of the German Patent document DE19927872A1.*
(Continued)

*Primary Examiner* — William R Alexander
(74) *Attorney, Agent, or Firm* — Fitch, Even, Tabin & Flannery LLP

(57) ABSTRACT

The invention relates to a holding apparatus for an optical measurement device. The holding apparatus has two holding units for two preferably telecentric optics units of the measurement device. Each holding unit has a first bearing device and a second bearing device. The two bearing devices are arranged at a distance from one another in the direction of an optical axis of the optics unit. A three-point bearing by three bearing elements for the associated optics unit is provided on each bearing device. At least two of the bearing elements can be positioned along a relevant adjustment axis. The adjustment axes extend substantially at right angles to the relevant optical axis. The optics unit can thus be displaced in a plane spanned by the adjustment axes and can be inclined or tilted on account of the two bearing devices distanced from one another.

14 Claims, 5 Drawing Sheets

(51) Int. Cl.
  *G01B 5/00*   (2006.01)
  *G01B 11/24*  (2006.01)
  *G01B 11/27*  (2006.01)
  *G02B 13/22*  (2006.01)

(52) U.S. Cl.
  CPC ............... *G01B 11/27* (2013.01); *G02B 7/00* (2013.01); *G02B 7/023* (2013.01); *G02B 13/22* (2013.01)

(58) Field of Classification Search
  CPC .. G02B 13/22; G01B 5/0004; G01B 11/2433; G01B 11/27
  USPC .................................................. 359/663, 830
  See application file for complete search history.

(56) References Cited

U.S. PATENT DOCUMENTS

| | | | |
|---|---|---|---|
| 4,764,010 A | | 8/1988 | Bachmann et al. |
| 5,363,559 A | * | 11/1994 | McCarty ............ F41G 1/38 33/298 |
| 5,457,577 A | * | 10/1995 | Wilson ............ G02B 7/026 359/811 |
| 5,956,190 A | * | 9/1999 | Sieg ............ G02B 23/16 359/827 |
| 6,425,188 B1 | | 7/2002 | Danielli |
| 6,449,526 B1 | * | 9/2002 | Sachs ............ B23Q 17/09 700/164 |
| 8,528,140 B1 | * | 9/2013 | Phillips ............ F41G 11/003 12/111 |
| 8,964,023 B2 | | 2/2015 | Neumann et al. |
| 2007/0288121 A1 | * | 12/2007 | Shibazaki ............ G03F 7/70516 700/213 |
| 2009/0091723 A1 | * | 4/2009 | Sasaki ............ B82Y 10/00 355/53 |
| 2009/0116039 A1 | * | 5/2009 | Hidaka ............ G03F 9/7026 356/622 |
| 2010/0245850 A1 | * | 9/2010 | Lee ............ F42B 35/02 356/625 |
| 2011/0043803 A1 | * | 2/2011 | Nygaard ............ G01B 11/2425 356/399 |
| 2013/0070229 A1 | * | 3/2013 | Shibazaki ............ G03F 7/70516 355/72 |
| 2013/0222900 A1 | * | 8/2013 | Shen ............ G02B 23/16 359/419 |
| 2014/0071243 A1 | * | 3/2014 | Nakatsukasa ......... G01B 11/24 348/46 |
| 2014/0206991 A1 | * | 7/2014 | Korporaal ............ A61B 5/026 600/431 |

FOREIGN PATENT DOCUMENTS

| | | |
|---|---|---|
| DE | 3630702 A1 | 3/1988 |
| DE | 4030994 A1 | 4/1992 |
| DE | 19927872 A1 | 10/2000 |
| DE | 69816648 T2 | 6/2004 |
| DE | 10319947 A1 | 11/2004 |
| DE | 10152038 C5 | 6/2008 |
| DE | 102008013308 A1 | 9/2009 |
| DE | 102010008416 A1 | 8/2011 |
| DE | 102010054742 A1 | 6/2012 |
| DE | 102012104008 B3 | 11/2013 |
| EP | 0619992 A1 | 10/1994 |
| JP | S63137855 U | 9/1988 |
| JP | H0497307 A | 3/1992 |
| KR | 101450672 B1 | 10/2014 |
| WO | 0244785 A2 | 6/2002 |

OTHER PUBLICATIONS

Office action in corresponding German Application No. 10 2015 105 978.9, dated Jan. 14, 2016, 5 pages.
Search Report and Written Opinion in corresponding European Application No. 16164345.7, dated Aug. 9, 2016, 20 pages.
Office Action in corresponding European Application No. 16164345.7, dated Sep. 9, 2017, 12 pages.
Notice of Reasons for Rejection in corresponding Japanese Application No. 2016-084173, dated Jul. 4, 2017, 4 pages.
Office Action in corresponding German Application No. 10 2015 105 978.9, dated Aug. 3, 2017, 31 pages.
Summary of the Arguments presented by the Opponent in the Office Action in corresponding German Application No. 10 2015 105 978.9, 2 pages.
Annex V1, Design drawing measuring unit contour.
Annex V2, Design drawing adapter plate f. ME.
Annex V3, Design drawing spindle insert f ME.
Annex V4, Design drawing of pivot bearing bolt, f. ME.
Annex V5, Manufacturing Plan f. CC305.
Annex V6, Gesamtdarstellg. Drehlagerg. (eg explanation).

* cited by examiner

HOLDING APPARATUS FOR AN OPTICAL MEASUREMENT DEVICE

RELATED APPLICATION(S)

This application claims the benefit of German Patent Application No. DE 10 2015 105 978.9 filed Apr. 20, 2015, the contents of which are incorporated herein by reference as if fully rewritten herein.

TECHNICAL FIELD

The invention relates to a holding apparatus for an optical measurement device. The optical measurement device is designed preferably for the measurement of objects, in particular shafts, and in particular of shafts that have planar surfaces.

BACKGROUND

DE 103 19 947 A1 describes a device for measuring the surface contour of rotationally symmetrical workpieces. A light source and an optical sensor are arranged oppositely relative to the workpiece to be measured, such that the workpiece can be positioned in the light beam. In this way, a measurement of transmitted light is possible.

A measurement device for transmitted light measurement is also described for example in DE 36 30 702 A1. The workpiece can be clamped on a carriage, which is movable along the workpiece axis. The workpiece can thus be moved along its longitudinal axis through the light path between a radiation source and a radiation detector, and the shadowing can be measured. From this, the axial and radial dimensions of the workpiece can be determined.

In the testing device described in DE 40 30 994 A1 for rotationally symmetrical workpieces, a mechanical probe and an optical measurement device are provided. These are arranged opposite one another in the radial direction with respect to the rotationally symmetrical workpiece to be measured. A position for the optical measurement device is determined so that the workpiece dips, up to one half, into the produced beam strip of the optical measurement device. The beam strip is oriented at the contour of the workpiece parallel to the tangential direction at the measurement point. Since the workpiece dips up to one half into the beam strip, the measurement of the contour of the workpiece will be taken at the point with the sharpest imaging, thus enabling an accurate measurement.

Various optical measurement devices are known from the prior art for measuring shafts. The applicant for example markets optical measurement machines of the "MarShaft Scope" type, with which shafts can be measured. Such optical measurement devices can have two optics units, specifically a lighting unit and a receiving unit, for example so as to measure a shaft or another object in the transmitted light. It is also known to use telecentric optics units for this purpose, since with telecentric optics units size can be determined independently of the distance from the object.

A number of challenges still exist in practice. Even with the use of a telecentric receiving unit and a telecentric lighting device, measurement inaccuracies can occur, which in particular have an effect when a length measurement is to be taken between two planar surfaces of the shaft, for example on a planar surface at which two cylindrical portions of the shaft of different diameter contact one another. A further challenge lies in the fact that measurement errors arise when the optical axes of the optics units are inclined relative to one another and/or are offset from one another.

SUMMARY

Proceeding from the known apparatuses, the object of the present invention can be considered that of creating a holding apparatus for an optical measurement device, which holding apparatus serves to reduce the measurement errors and can be produced economically.

The holding apparatus is set up for use in an optical measurement device. It has at least one holding unit for each provided optics unit of the measurement device, i.e. for a lighting unit and for a receiving unit. Each holding unit has a first bearing device and a second bearing device. The two bearing devices of a holding unit are arranged at a distance from one another in the direction of an optical axis or a mechanical axis of the relevant optics unit. The mechanical axis is a central longitudinal axis of the optics unit, which generally coincides approximately with the optical axis.

Each bearing device has a first bearing element at a first bearing location, a second bearing element at a second bearing location, and a third bearing element at a third bearing location. The bearing locations are distributed around the optical axis in the peripheral direction. The distance between the bearing locations in the peripheral direction may be different between directly adjacent bearing locations. Precisely three bearing locations are preferably provided in the peripheral direction around the optical axis per bearing device, such that an unambiguous position in the radial direction relative to the optical axis can be predefined without redundancy.

The first bearing element and the second bearing element and preferably also the third bearing element can be positioned. For positioning, the first, the second, and the third bearing element can be moved towards the optical axis or mechanical axis or away from the optical axis or mechanical axis, in each case along a first, second or third adjustment axis respectively, and can be fixed in the desired position. The first adjustment axis, the second adjustment axis, and third adjustment axis are oriented substantially at right angles to the optical axis. The substantially right-angled orientation of these adjustment axes is to be understood to mean that the angle between the first adjustment axis or the second adjustment axis or the third adjustment axis deviates from a right angle at most by a value of 30° or 15° or 10°.

As a result of this arrangement it is possible to position the optical unit transversely to the optical axis with the aid of the three bearing elements. Since the two bearing devices of a holding unit are arranged at a distance from one another along the optical axis or mechanical axis, an inclination of the optical axis of the optics unit held in the holding unit can additionally be provided relative to a reference axis of the measuring device, for example an optical axis of a further optics unit, about which the object to be measured is rotatably mounted. It is possible in this way to orientate the optical axis of the optics unit relative to at least one other reference axis with the aid of the holding unit. Measurement inaccuracies on account of misalignments of the optics unit can thus be reduced. The maximum possible inclination adjustment of the optical axis is dependent on the possible path of displacement of the individual bearing elements along the adjustment axes and the distance between the two bearing devices of the holding unit along the optical axis or mechanical axis. The maximum possible inclination adjustment can be 5.2°, for example.

The adjustment can be performed easily with the aid of the bearing elements. By way of example, threaded bolts can serve as bearing elements.

One or more or all adjustment axes can be oriented substantially radially to the optical axis.

It is also advantageous when the first adjustment axis, the second adjustment axis, and the third adjustment axis of a bearing device are arranged in a common adjustment plane. It is thus ensured that the positioning of the relevant bearing elements of a bearing device has substantially the same effect on the inclination of the optical axis.

The adjustment planes of the bearing devices of a holding unit are oriented parallel to one another in a preferred exemplary embodiment. The adjustment of the optics unit in the holding unit is thus simplified.

In a preferred embodiment each holding unit has a fourth bearing element at a fourth bearing location. The fourth bearing element can be positioned along a fourth adjustment axis. The fourth adjustment axis is oriented substantially parallel to the optical axis or mechanical axis. The substantially parallel orientation is to be understood to mean that the angle between the fourth adjustment axis is at most 30° or 15° or 10°. By way of example, a telecentric region or a depth of field region of the optics units can be positioned in the direction of the optical or mechanical axis with the aid of the fourth bearing element positionable along the fourth adjustment axis. The maximum possible path of adjustment along the optical or mechanical axis can be 4 mm, for example.

It is additionally advantageous when the at least one holding unit can be pivoted about a pivot axis oriented substantially at right angles to the optical axis and can be fixed in a pivoted position. The pivot axis extending substantially at right angles to the optical axis is to be understood to mean that the angle between the pivot axis and the optical axis deviates from a right angle at most by 10° or 5°. By means of the pivotability, the optical axis can be oriented at right angles relative to a reference axis. The pivot axis is preferably arranged at a distance from the adjustment axes of the holding unit in the direction of the optical axis. The pivot axis is preferably oriented parallel to the adjustment planes.

In a preferred embodiment of the holding apparatus two holding units are provided for each optics unit. The two holding units are arranged parallel to the optical axes, considered at a distance from one another. The optical axes can be oriented relative to one another via the two holding units. The objective is to orientate the optical axes in parallel and preferably in alignment.

It is advantageous when the two holding units are arranged on a common supporting part. The supporting part may be formed integrally without separation points and joints. The supporting part is preferably formed as a lightweight component, in particular as a profile body. By way of example, the supporting part can be produced from an extruded profile. The supporting part can consist of a metal or a metal alloy.

In order to provide the pivotability of the holding units, it is advantageous when the supporting part is arranged on a body such that it can be pivoted about the pivot axis and can be fixed in a desired pivoted position. In this way, the optical axes of the optics units oriented relative to one another and preferably aligned via the bearing elements of the bearing devices can be jointly pivoted, such that they assume a desired orientation relative to a reference axis, for example are oriented at right angles to a reference axis.

It is preferable when the body, on which the supporting part is pivotably arranged, is mounted on a guide device in a movably guided manner. The body by way of example can form a linearly movable carriage. Both measurement units can thus be moved jointly along a path, for example linearly, with the aid of the movably guided body.

At least one, and in particular both, provided optics units is/are preferably formed as (a) telecentric optics unit(s). It is preferable when the pivot axis is arranged such that it passes through a telecentric region and in particular both telecentric regions of the telecentric optics unit or optics units.

The above-described holding apparatus is preferably set up for use in an optical measurement device comprising at least one optics unit and preferably at least one telecentric optics unit. The measurement device is designed to measure a planar surface on an object, preferably a shaft. The planar surface extends in particular at an incline or at right angles to the longitudinal axis of the shaft.

Advantageous embodiments of the holding apparatus will emerge from the dependent claims, the description, and the drawings. Preferred exemplary embodiments of the invention will be explained in detail hereinafter on the basis of the drawings, in which:

DETAILED DESCRIPTION

Figure 1:
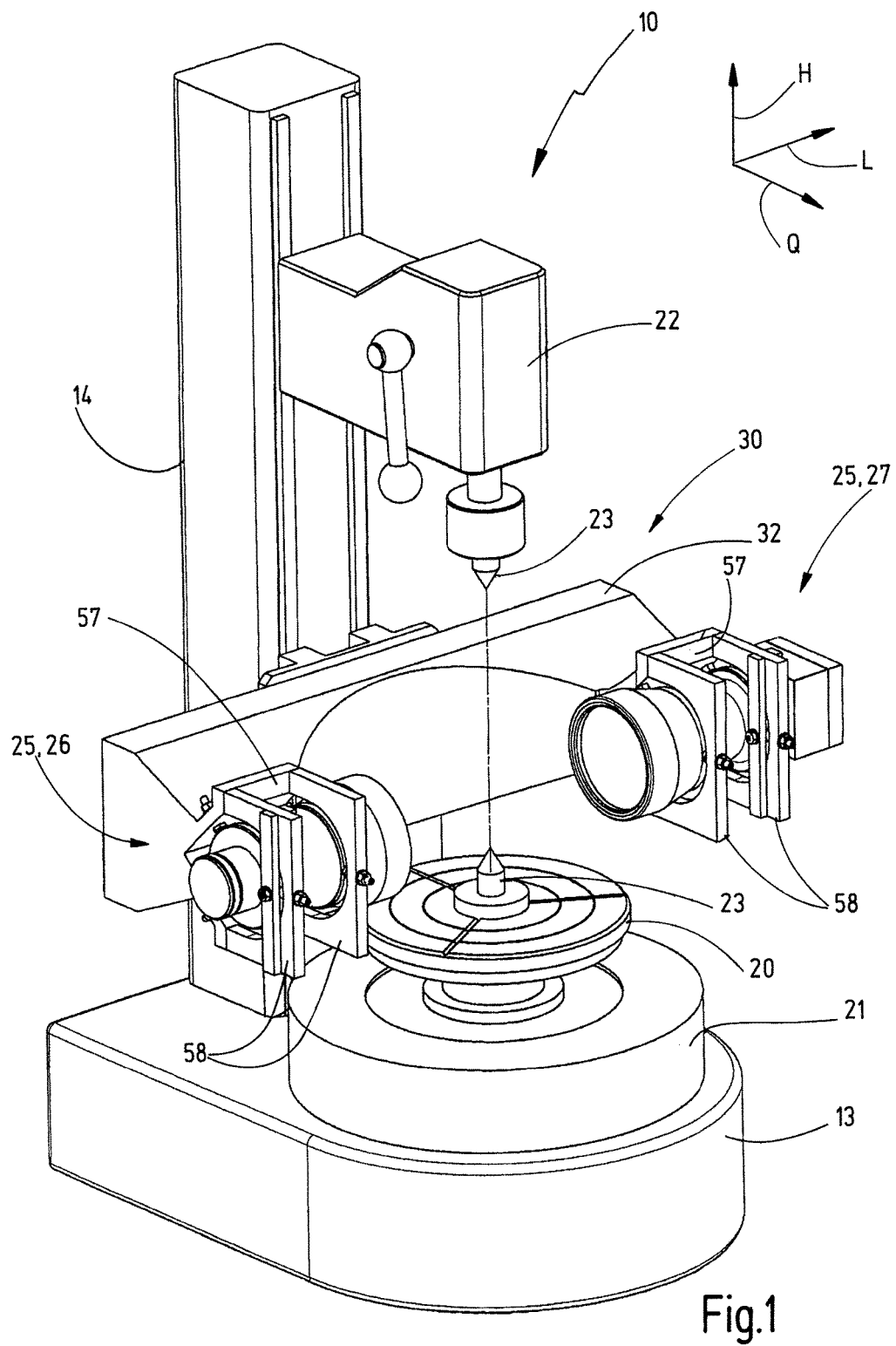
FIG. 1 shows a perspective illustration of an exemplary embodiment of an optical measurement device.
Figure 2:
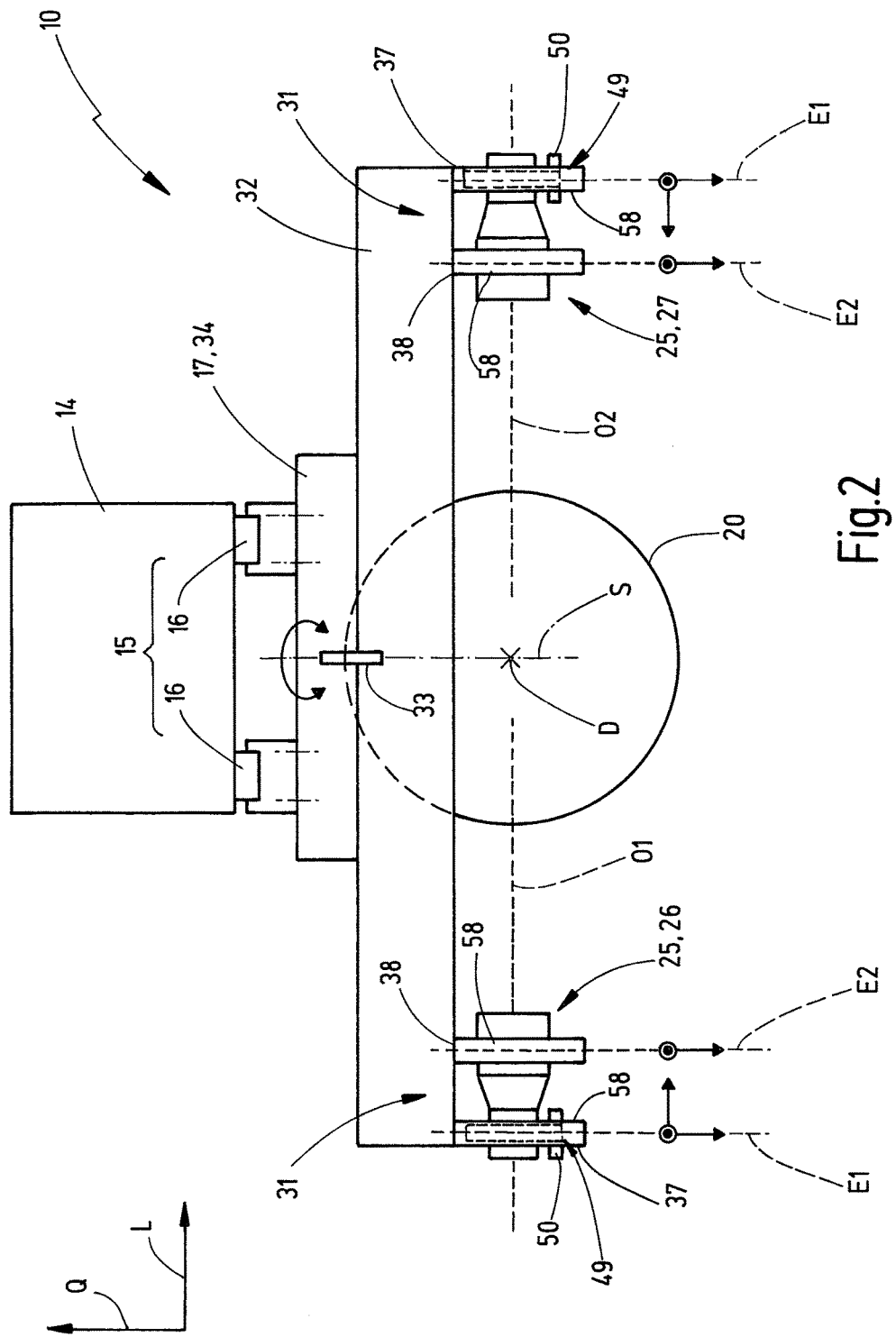
FIG. 2 shows an illustration, similar to a block diagram, of the measurement device from FIG. 1 in a view in a vertical direction.

FIGS. 1 and 2 illustrate an embodiment of an optical measurement device 10 for measuring objects, for example shafts 11 and in particular planar surfaces 12 on shafts 11. An exemplary shaft 11 having planar surfaces 12 is illustrated schematically in FIG. 5. The object to be measured can, but does not have to be rotationally symmetrical.

The optical measurement device 10 has, in the exemplary embodiment illustrated in FIGS. 1 and 2, a main body 13. A guide pillar 14 is secured to the main body 13 and extends in a vertical direction H starting from the main body 13. A guide device 15 is provided on the guide pillar 14 and is formed in accordance with the example by two guide rails 16 extending parallel to one another in the vertical direction H. A carriage 17 is arranged on the guide device 15 in a manner guided displaceably in the vertical direction H.

The vertical direction H, a longitudinal direction L, and a transverse direction Q form a Cartesian coordinate system.

In the exemplary embodiment illustrated here, a rotary table 20 is arranged on the main body 13, the axis of rotation D of said rotary table being oriented parallel to the vertical direction H and consequently parallel to the guide pillar 14. The rotary table 20 can be driven about the axis of rotation D via a rotary drive 21.

A tailstock 22 is arranged on the guide pillar 14 so as to be displaceable manually and/or in a motor-driven manner. For measurement, the shaft 11 can be arranged and held between the tailstock 22 and the rotary table 20. For this purpose, a mandrel 23 is provided in this exemplary embodiment both on the tailstock 22 and on the rotary table 20. The shaft 11 can be received between the two mandrels 23 in corresponding centering bores arranged on each end face and can be held rotatably about the axis of rotation D.

Figure 3:
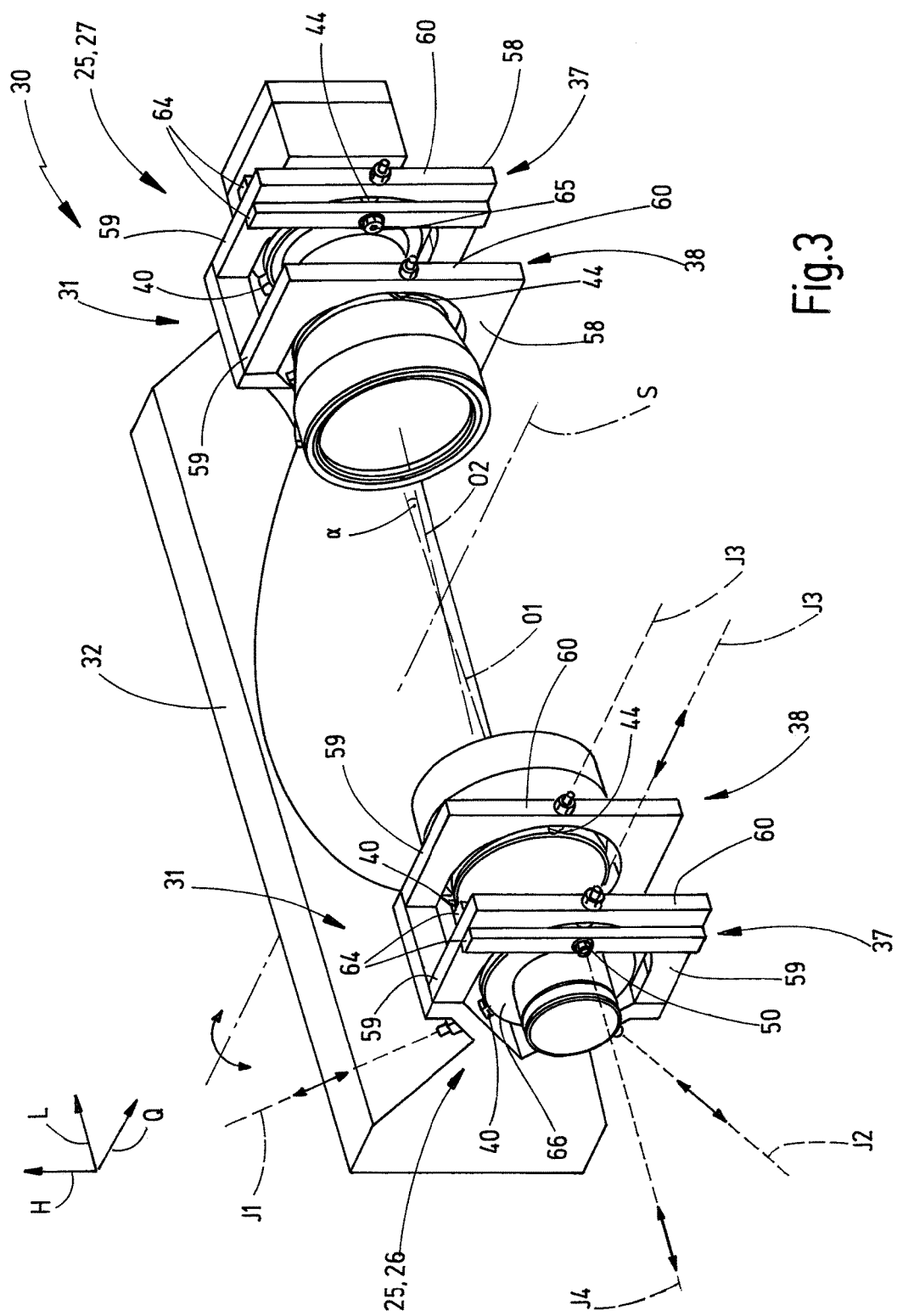
FIG. 3 shows a perspective illustration of an exemplary embodiment of a holding apparatus of the measurement device according to FIGS. 1 and 2.
Figure 5:
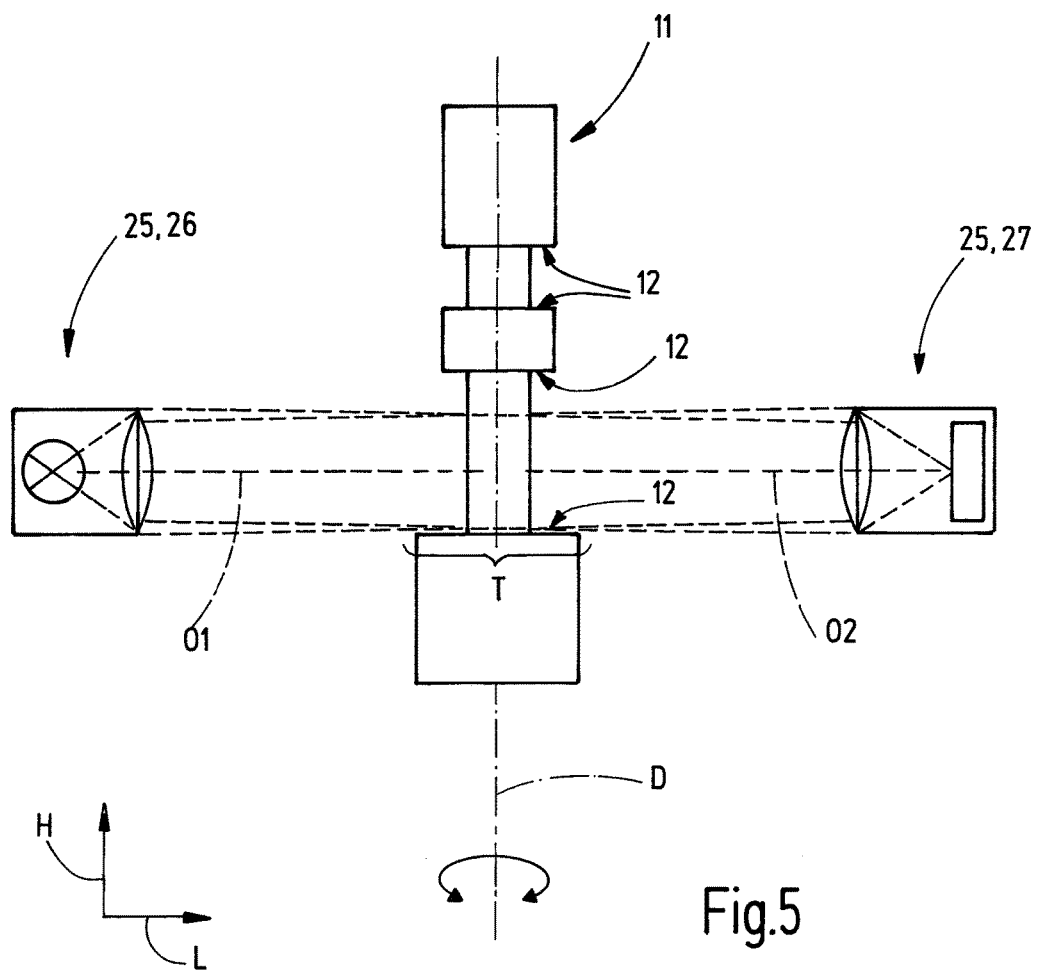
FIG. 5 shows a schematic illustration, similar to a block diagram, of a telecentric region of the optical measurement device according to FIGS. 1 and 2 during the measurement of a shaft having planar surfaces.

The optical measurement device has two optics units 25, which are formed in accordance with the example as telecentric optics units 25. One optics unit 25 is a light source 26, whereas the other optics unit 25 is a receiver 27, for example a matrix camera or line scan camera. The two telecentric optics unit 25 are arranged oppositely on opposite sides with respect to the axis of rotation D. Each optics unit 25 has an optical axis, wherein the optical axis of the light source 26 is designated as the first optical axis O1 and the optical axis of the receiver 27 is designated as the second optical axis O2 (FIGS. 2, 3 and 5).

For mounting and adjustment of the two optics unit 25, a holding apparatus 30 is provided. The holding apparatus 30 has a holding unit for each optics unit 25. The two holding units 31 are arranged in the exemplary embodiment on a common supporting part 32. The supporting part 32 is mounted pivotably about a pivot axis S in the exemplary embodiment. The pivot axis S extends in the transverse direction Q. The supporting part 32 extends at right angles to the transverse direction Q and can extend by way of example substantially in the longitudinal direction L. Due to the pivotability, however, the supporting part 32 can also extend at an incline to the longitudinal direction L.

The pivot bearing of the supporting part 32 about the pivot axis S is illustrated schematically in FIG. 2. A pivot journal 33 connects the supporting part 32 to a body 34, on which the supporting part 32 is pivotably mounted. The body 34 is formed in the exemplary embodiment by the carriage 17. As a result of this pivot bearing of the supporting part 32, the optical axes O1, O2 of the optics units 25 can be inclined jointly about the pivot axis S. It is thus possible to orientate the optical axes O1, O2 at right angles to a reference axis, for example at right angles to the axis of rotation D.

In the desired pivoted position, the supporting part 32 and the body 34 or the carriage 17 are locked relative to one another, such that the desired pivoted position is retained and remains unchanged during operation of the measurement device 10. The pivotability about the pivot axis S serves for calibration of the measurement device in the event of first-time commissioning or following a repair or maintenance of the measurement device 10. During the measurement operation, no pivoting movement about the pivot axis S takes place.

Each holding unit 31 has a first bearing device 37 and a second bearing device 38. The two bearing devices 37, 38 of a holding unit 31 are arranged at a distance from one another in the direction of the optical axis O1 or O2 in question. The bearing devices 37, 38 can be seen in greater detail in particular in FIGS. 3 and 4. Each bearing device 37, 38 has a first bearing element 40 at a first bearing location 39 or bearing point, a second bearing element 42 at a second bearing location 41 or bearing point, and a third bearing element 44 at a third bearing location 43 or bearing point. At least some of the bearing elements 40, 42, 44 can be positioned. The bearing locations 39, 41, 43 in question can thus be shifted in space and in accordance with the example at right angles relative to the optical axis O1, O2 in question. At each bearing location 39, 41, 43, the bearing element 40, 42, 44 in question is in contact with the associated optics unit 25. When positioning the bearing location 39, 41, 43, the optics unit 25 is therefore positioned or adjusted.

In the exemplary embodiment the first bearing element 40 can be positioned along a first adjustment axis J1, the second bearing element 42 can be positioned along a second adjustment axis J2, and the third bearing element 44 can be positioned along a third adjustment axis J3. The possibility to position the bearing elements 40, 42, 44 along the relevant adjustment axis J1, J2, J3 is illustrated by the double-headed arrows in FIGS. 3 and 4 and by the arrows in and perpendicularly to the drawing plane in FIG. 2. The possibility to position the bearing elements 40, 42, 44 along the relevant adjustment axis J1, J2, J3 is provided with all bearing devices 37, 38, even though this is illustrated in each of FIGS. 3 and 4 only for a first bearing device 37 for reasons of clarity.

The first, the second and the third adjustment axis J1, J2, J3 are each arranged in a common adjustment plane in the exemplary embodiment. Here, the first bearing device 37 forms a first adjustment plane E1 and the second bearing device 38 forms a second adjustment plane E2. The two adjustment planes E1, E2 are oriented parallel to one another in the exemplary embodiment described here.

Figure 4:
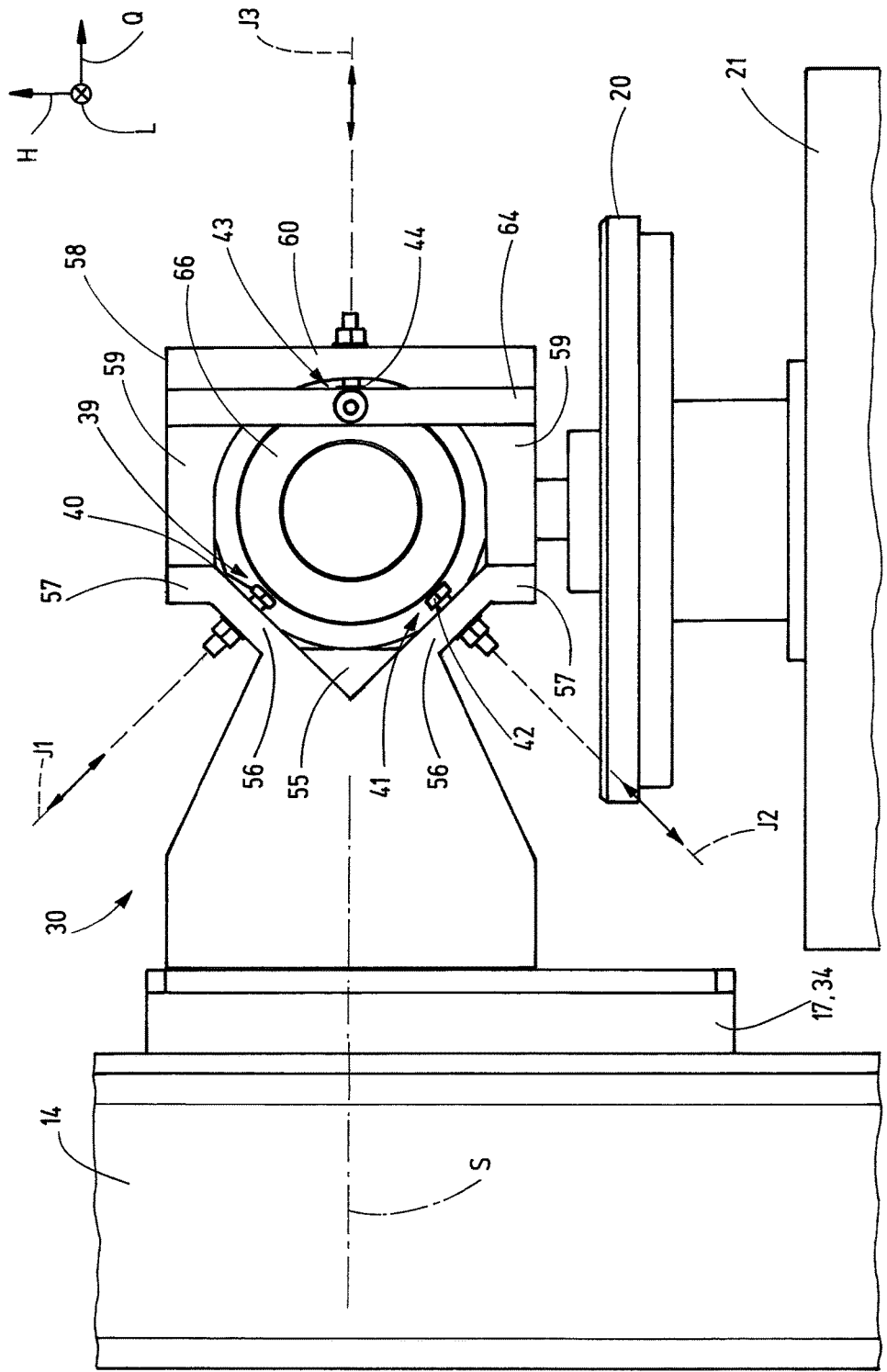
FIG. 4 shows a view of the holding apparatus from FIG. 3 in a longitudinal direction approximately parallel to the optical axes of the optics units.

As can be seen in particular in FIG. 4, the first, the second, and the third adjustment axis J1, J2, J3 in the exemplary embodiment intersect one another at a common point, preferably at the relevant optical axis O1 or O2.

The pivot axis S extends parallel to the adjustment planes E1, E2. The optics unit 25 associated with the holding unit 31 can be positioned in each adjustment plane E1, E2 in both dimensions or degrees of freedom (FIG. 2). The relevant optical axis O1, O2 can thus be inclined or tilted and consequently oriented relative to the supporting part 32 or the pivot axis S or the axis of rotation D or another reference part of the measurement device 10. Precisely two bearing devices 37, 38 are therefore provided per holding unit 31.

Since a corresponding holding unit 31 having two bearing devices 37, 38 is provided for each optics unit 25, the two optical axes O1, O2 can be oriented relative to one another and/or relative to at least one reference axis (for example the axis of rotation D). It is possible in particular to orientate the two optical axes O1, O2 such that they extend parallel to one another and ideally are aligned with one another. A misalignment of the optical axes O1, O2 is illustrated schematically and merely by way of example in FIG. 3. These axes intersect one another there at an angle α. Optical axes O1, O2 that are not ideally oriented can also extend in a skewed manner relative to one another with no point of intersection. With the aid of the bearing devices 37, 38, these misalignments can be eliminated or at least reduced.

In the illustrated exemplary embodiment the first bearing device 37 has a fourth bearing location 49 or bearing point having a fourth bearing element 50. At the fourth bearing location 49, the fourth bearing element 50 is in contact with the associated optics unit 25. The fourth bearing element 50 can be positioned along a fourth adjustment axis J4. The fourth adjustment axis J4 extends substantially parallel to the optical axis in question O1 or O2 and in accordance with the example at right angles to the pivot axis S. With the aid of the positionable fourth bearing element 50, the optics unit 25 can be positioned towards the pivot axis S or away from the pivot axis S.

In the preferred exemplary embodiment of the holding apparatus 30 illustrated here, the bearing elements 40, 42, 44, 50 are each formed by adjustment screws. They can be fixed in their positions by a lock nut. It is also possible to resiliently preload the first or the second or the third bearing element 40, 42, 44 in a starting position against the optics unit 25 in question and to arrange said bearing element so as to be movable against the force of a preload element.

The supporting part 32 has a prismatic indentation 55 at each of its two end regions, said indentations being formed by two flanks 56 extending at right angles to one another in accordance with the example. The cutting edge, at which the two flanks 56 intersect one another, is oriented radially relative to the pivot axis S. The first bearing element 40 is arranged in a positionable manner in one flank 56, and the second bearing element 42 is arranged in a positionable manner in the other flank 56, said bearing elements being positionable via a lockable threaded connection in accordance with the example.

Each flank 56 has at its free end edge a securing flange 57. The two securing flanges 57 extend preferably in a common plane. At least one holding clip 58 can be secured to the securing flanges, and for example screwed. By way of example, each bearing device 37, 38 has a holding clip 58, on which the third bearing element 44 is arranged in a positionable manner. The third bearing element 44 can be adjusted with the aid of a screwed connection and can be arranged on the holding clip 58 so as to be lockable in its desired position, or, as discussed above, can be movably mounted in a manner resiliently preloaded against the force of a preload element.

The holding clip has a U-shaped or V-shaped design. In the exemplary embodiment it has two limbs extending parallel to one another, the free ends of which are assigned to the fastening flanges 57. The two limbs 59 of the holding clip 58 are interconnected on the side opposite the supporting part 32 by a connecting part 60.

In the exemplary embodiment the first adjustment axis J1 and the second adjustment axis J2 enclose approximately a right angle. The angle between the first adjustment axis or the second adjustment axis J1 or J2 and the third adjustment axis J3 is for example 135° in each case.

At least one holding element and in accordance with the example two holding elements 64 is/are additionally arranged on the holding clip 58 of the first bearing device 37. The holding element 64 extends approximately parallel to the connecting part 60 of the holding clip 58 between the two limbs 59. The fourth bearing element 50 is arranged on one holding element 64, wherein the securing is embodied similarly to the other bearing elements 40, 42, 44. The holding element 64 supporting the fourth bearing element 50 is arranged in accordance with the example on the side of the holding clip 58 of the first bearing device 37 facing away from the second bearing device 38 of the same holding unit 31. The further holding element 64 provided in accordance with the example is arranged on the opposite side of the holding clip 58 on the side facing towards the second bearing device 38. There, a stop 65 can be arranged, which is adjustable along the fourth adjustment axis J4.

Figure 6:
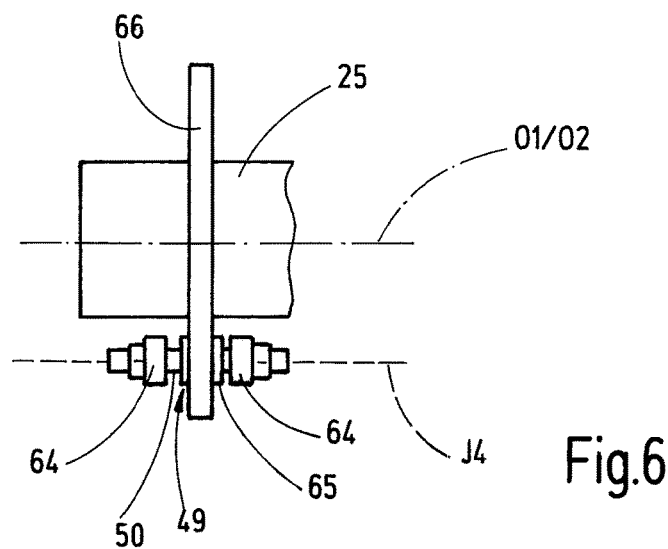
FIG. 6 shows a partial illustration, similar to a block diagram, in the region of a fourth bearing location of a bearing device of the exemplary embodiment of the holding apparatus.

This arrangement is illustrated highly schematically in FIG. 6. For improved clarity, the holding clip 58 is not illustrated there, but merely the two holding elements 64. The optical unit 25 in accordance with the example has an annular flange 66, which extends in part between the two holding elements 64. The annular flange 66 can thus be acted on by the fourth bearing element 50 and also by the stop 65. The axial position of the optics unit 25 can thus be adjusted and fixed along the fourth adjustment unit J4 or along the optical axis in question O1 or O2. The stop 65 can be held adjustably on the holding element 64 via a threaded connection similarly to the bearing elements 50 and can be fixed in its desired position, for example via a lock nut, as is also the case with the bearing elements 40, 42, 44, 50.

The first bearing element 40, the second bearing element 42, and the third bearing element 44 of the first bearing device 37 can also act on the annular flange 66.

The measurement of a shaft 11 by means of the measurement device 10 is illustrated in a highly schematic manner in FIG. 5, wherein merely the two optics units 25 are illustrated. The two optics units 25 are oriented relative to one another via the associated holding units 31, such that the two optical axes O1, O2 extend parallel to one another and preferably are aligned with one another with no offset. In addition, the two optical axes O1, O2 are pivoted about the pivot axis S such that they are oriented at right angles to the axis of rotation D.

By displacing the optics units 25 along the relevant optical axis O1, O2, a telecentric region T can be arranged around the axis of rotation D. The light beams irradiated from the light source 26 are sufficiently parallel to one another in the telecentric region T, such that a dimensional measurement can be taken with the necessary accuracy. This also enables the measurement of planar surfaces 12 on a shaft 11 that are oriented substantially at right angles to the axis of rotation D.

Due to the use of the holding apparatus 30 in a measurement device 10 which is set up for the measurement of shafts 11 and planar surfaces 12 provided thereon, the measurement errors caused by an incorrect orientation of the optics units 25 can be minimised. The optical axis O1 of the light source 26 and the optical axis O2 of a receiver 27 can be oriented relative to one another and, ideally, can be aligned. In addition the telecentric region T, which is provided approximately centrally between the light source 26 and the receiver 27 with the lowest telecentric deviation, can be arranged around the axis of rotation D or the shaft to be measured by the positioning of the light source 26 and/or the receiver 27 along the relevant optical axis O1, O2.

The invention relates to a holding apparatus 30 for an optical measurement device 10. The holding apparatus 30 has two holding units 31 for two preferably telecentric optics units 25 of the measurement device 10. Each holding unit 31 has a first bearing device 37 and a second bearing device 38. The two bearing devices 37, 38 are arranged at a distance from one another in the direction of an optical axis O1, O2 of the optics unit. A three-point bearing by three bearing elements 40, 42, 44 for the associated optics unit 25 is provided on each bearing device 37, 38. At least two of the bearing elements 40, 42, 44 can be positioned along a relevant adjustment axis J1, J2, J3. The adjustment axes J1, J2, J3 extend substantially at right angles to the relevant optical axis O1, O2. The optics unit 25 can thus be displaced in a plane spanned by the adjustment axes J1, J2, J3 and can be inclined or tilted on account of the two bearing devices 37, 38 distanced from one another. The optical axes in question O1, O2 are displaced at right angles by identical adjustment of the bearing elements 40, 42, 44 along the adjustment axes J1, J2, J3 on both bearing devices 37, 38.

LIST OF REFERENCE SIGNS 1 optical measurement device
1 shaft
12 planar surface 13 main body
14 guide pillar
15 guide device
16 guide rail
17 carriage
20 rotary table
21 rotary drive
22 tailstock
23 mandrel
25 optics unit
26 light source
27 receiver
30 holding apparatus
31 holding unit
32 supporting part
33 pivot journal
34 body
37 first bearing device
38 second bearing device
39 first bearing location
40 first bearing element
41 second bearing location
42 second bearing element
43 third bearing location
44 third bearing element
49 fourth bearing location
50 fourth bearing element
55 indentation
56 flank
57 securing flange
58 holding clip
59 limb
60 connecting part
64 holding element
65 stop
66 annular flange
α angle
E1 first adjustment plane
E2 second adjustment plane
H vertical direction
J1 first adjustment axis
J2 second adjustment axis
J3 third adjustment axis
J4 fourth adjustment axis
L longitudinal direction
O1 first optical axis
O2 second optical axis
Q transverse direction
T telecentric region

What is claimed is:

1. A holding apparatus (30) for an optical measurement device (10), the holding apparatus comprising:
at least one holding unit (31) for an optics unit (25) of the measurement device (15), wherein the at least one holding unit (31) comprises a first bearing device (37) and a second bearing device (38), which are arranged at a distance from one another in an optical axis (O1, O2) direction,
wherein the first bearing device (37) and the second bearing device (38) each comprise a first bearing element (40) at a first bearing location (39), a second bearing element (42) at a second bearing location (41), and a third bearing element (44) at a third bearing location (43),
wherein the first bearing element (40) is adjustable along a first adjustment axis (J1) and the second bearing element (42) is adjustable along a second adjustment axis (J2), and wherein the first adjustment axis (J1) and the second adjustment axis (J2) extend substantially at right angles to the optical axis (O1, O2),
wherein the at least one holding unit (31) is pivotable about a pivot axis (S) oriented substantially at right angles to the optical axis (O1, O2) and can be fixed in a pivoted position, and
wherein one or more of the at least one optics unit (25) is telecentric and has a telecentric region (T) along a portion of the optical axis (O1, O2) and the pivot axis (S) passes through the at least one telecentric region (T).

2. The holding apparatus according to claim 1, wherein the third bearing element (44) is adjustable along a third adjustment axis (J3).

3. The holding apparatus according to claim 1, wherein at least the first, second, or third adjustment axis (J1, J2, J3) is oriented substantially radially to the optical axis (O1, O2).

4. The holding apparatus according to claim 1, wherein the first adjustment axis (J1) and the second adjustment axis (J2) of a bearing device (37, 38) are arranged in a common adjustment plane (E1, E2).

5. The holding apparatus according to claim 4, wherein the two adjustment planes (E1, E2) of the at least one holding unit (31) are oriented parallel to one another.

6. The holding apparatus according to claim 1, wherein the at least one holding unit (31) has a fourth bearing element (50) at a fourth bearing location (49), which is adjustable along a fourth adjustment axis (J4), which is oriented substantially parallel to the optical axis (O1, O2).

7. The holding apparatus according to claim 1, wherein the pivot axis (S) is arranged in optical axis (O1, O2) direction at a distance from the first adjustment axis (J1) and the second adjustment axis (J2).

8. The holding apparatus according to claim 1, wherein two of the holding units (31) for the optics unit (25) are arranged parallel to their respective relevant optical axes (O1, O2) at a distance from one another.

9. The holding apparatus according to claim 8, wherein the two holding units (31) are arranged on a common supporting part (32).

10. The holding apparatus according claim 9, wherein the supporting part (32) is arranged on a body (34) such that it can be pivoted about the pivot axis (S) and can be fixed in a pivoted position.

11. The holding apparatus according to claim 10, wherein the body (34) is mounted on a guide device (15) in a movably guided manner.

12. A method of using a holding apparatus according to claim 1 in an optical measurement device (10) comprising at least one optics unit (25), which is set up to measure a planar surface (12) on an object (11).

13. A holding apparatus (30) for an optical measurement device (10), the holding apparatus comprising:
at least one holding unit (31) for an optics unit (25) of the measurement device (15), wherein the at least one holding unit (31) comprises a first bearing device (37) and a second bearing device (38), which are arranged at a distance from one another in an optical axis (O1, O2) direction,
wherein the first bearing device (37) and the second bearing device (38) each comprise a first bearing element (40) at a first bearing location (39), a second bearing element (42) at a second bearing location (41), and a third bearing element (44) at a third bearing location (43), wherein the first bearing element (40) is adjustable along a first adjustment axis (J1) and the second bearing element (42) is adjustable along a second adjustment axis (J2), and wherein the first adjustment axis (J1) and the second adjustment axis (J2) extend substantially at right angles to the optical axis (O1, O2), wherein the at least one holding unit (31) is pivotable about a pivot axis (S) oriented substantially at right angles to the optical axis (O1, O2) and can be fixed in a pivoted position, and wherein the pivot axis (S) is arranged in optical axis (O1, O2) direction at a distance from the first adjustment axis (J1) and the second adjustment axis (J2).

14. A holding apparatus (30) for an optical measurement device (10), the holding apparatus comprising:

at least one holding unit (31) for an optics unit (25) of the measurement device (15), wherein the at least one holding unit (31) comprises a first bearing device (37) and a second bearing device (38), which are arranged at a distance from one another in an optical axis (O1, O2) direction, wherein the first bearing device (37) and the second bearing device (38) each comprise a first bearing element (40) at a first bearing location (39), a second bearing element (42) at a second bearing location (41), and a third bearing element (44) at a third bearing location (43), wherein the first bearing element (40) is adjustable along a first adjustment axis (J1) and the second bearing element (42) is adjustable along a second adjustment axis (J2), and wherein the first adjustment axis (J1) and the second adjustment axis (J2) extend substantially at right angles to the optical axis (O1, O2), a second holding unit (31) for an optics unit (25) with an optical axis (O1, O2), wherein the at least one holding unit (31) and the second holding unit (31) are arranged parallel to their respective relevant optical axes (O1, O2) at a distance from one another and are arranged on a common supporting part (32), wherein the at least one holding unit (31) is pivotable about a pivot axis (S) oriented substantially at right angles to the optical axis (O1, O2) and can be fixed in a pivoted position and the supporting part (32) is arranged on a body (34) such that it can be pivoted about the pivot. axis (S) and can be fixed in a pivoted position, and wherein the body (34) is mounted on a guide device (15) in a movably guided manner.

* * * * *